(12) United States Patent
Danielson et al.

(10) Patent No.: US 11,415,349 B2
(45) Date of Patent: Aug. 16, 2022

(54) SERVICE CONNECTION VALVE ASSEMBLY

(71) Applicant: FasTest, Inc., Roseville, MN (US)

(72) Inventors: Robert Danielson, Roseville, MN (US); Christopher Wagner, Roseville, MN (US); Allen Wagenius, Roseville, MN (US)

(73) Assignee: FasTest, Inc., Roseville, MN (US)

( * ) Notice: Subject to any disclaimer, the term of this patent is extended or adjusted under 35 U.S.C. 154(b) by 0 days.

(21) Appl. No.: 16/529,237

(22) Filed: Aug. 1, 2019

(65) Prior Publication Data
US 2020/0041182 A1 Feb. 6, 2020

Related U.S. Application Data

(60) Provisional application No. 62/713,180, filed on Aug. 1, 2018.

(51) Int. Cl.
*F16K 1/04* (2006.01)
*F25B 45/00* (2006.01)
*F16K 1/12* (2006.01)

(52) U.S. Cl.
CPC ............... *F25B 45/00* (2013.01); *F16K 1/04* (2013.01); *F16K 1/12* (2013.01)

(58) Field of Classification Search
CPC ... F16K 1/12; F16K 1/302; F16K 1/38; F16K 31/50; F16K 1/48; F16K 1/487;
(Continued)

(56) References Cited

U.S. PATENT DOCUMENTS 1,423,418 A * 7/1922 Grikscheit .............. F16K 15/18
251/346
2,170,478 A 8/1939 Long et al.
(Continued)

FOREIGN PATENT DOCUMENTS

EP 0554752 8/1993
EP 3736473 11/2020
(Continued)

OTHER PUBLICATIONS

International Search Report and Written Opinion, issued in the corresponding PCT application No. PCT/IB2019/056296, dated Dec. 23, 2019, 13 pages.
(Continued)

*Primary Examiner* — Hailey K. Do
(74) *Attorney, Agent, or Firm* — Hamre, Schumann, Mueller & Larson, P.C.

(57) ABSTRACT

A simplified service connection valve assembly that provides access to fluid systems, such as air conditioning units, freezer units, refrigeration units and like systems, for fluid processing through the valve assembly. The valve assembly can include a valve body and a valve core received in the valve body. The valve core is movable relative to the valve body in a direction parallel to the longitudinal axis between an open position allowing fluid flow through the valve assembly and a closed position preventing fluid flow through the valve assembly. At the closed position, a metal-to-metal seal is created between the valve body and the valve core which creates a seal to prevent fluid flow through the valve assembly.

7 Claims, 12 Drawing Sheets

(58) Field of Classification Search
CPC .. F16K 31/58; F16K 1/04; F25B 45/00; F25B 41/24; F25B 2345/006
See application file for complete search history.

(56) References Cited

U.S. PATENT DOCUMENTS

| | | | |
|---|---|---|---|
| 2,594,641 A | 4/1952 | Griffith et al. | |
| 2,928,417 A | 3/1960 | Buckner et al. | |
| 3,083,723 A | 4/1963 | Duchin | |
| 3,419,040 A | 12/1968 | Thibodeaux | |
| 3,756,273 A | 9/1973 | Hengesbach | |
| 3,800,824 A | 4/1974 | Medina | |
| 3,948,481 A * | 4/1976 | Pollock | F01P 11/0276 251/351 |
| 3,995,658 A | 12/1976 | Hager | |
| 4,026,320 A | 5/1977 | Grahl | |
| 4,184,661 A | 1/1980 | Kushner et al. | |
| 4,340,080 A | 7/1982 | Lefrancois | |
| 4,506,695 A | 3/1985 | Kuypers | |
| 4,529,167 A * | 7/1985 | Harrison | F16K 1/12 251/144 |
| 4,644,973 A | 2/1987 | Itoh et al. | |
| 4,979,721 A | 12/1990 | Gilbert | |
| 5,067,521 A | 11/1991 | Jenks et al. | |
| 5,139,049 A | 8/1992 | Jensen et al. | |
| 5,339,862 A | 8/1994 | Haunhorst | |
| 5,396,774 A | 3/1995 | Hubbell, Jr. | |
| 5,415,200 A | 5/1995 | Haunhorst et al. | |
| 5,727,773 A * | 3/1998 | Dunnigan | F16K 1/12 251/205 |
| 6,041,818 A | 3/2000 | Schadewald et al. | |
| 6,050,295 A | 4/2000 | Meisinger et al. | |
| 6,113,071 A * | 9/2000 | Bossard | F16K 1/385 251/341 |
| 6,266,971 B1 * | 7/2001 | Schroder | B60H 1/00485 62/292 |
| 6,901,947 B2 | 6/2005 | Danielson et al. | |
| 2002/0066487 A1 | 6/2002 | Danielson et al. | |
| 2004/0261437 A1 * | 12/2004 | Ohno | F16K 1/50 62/222 |
| 2010/0126597 A1 * | 5/2010 | Groben | F16K 1/04 137/383 |
| 2010/0276622 A1 * | 11/2010 | Tanaka | F16K 51/00 251/318 |
| 2017/0368903 A1 | 12/2017 | Kesler et al. | |

FOREIGN PATENT DOCUMENTS

| | | | | |
|---|---|---|---|---|
| GB | 153836 A | * | 11/1920 | F16K 1/302 |
| GB | 192529 A | * | 2/1923 | F16K 31/58 |
| JP | 51-025123 | | 2/1976 | |
| JP | 04-043773 | | 4/1992 | |
| JP | 2016-017620 | | 2/2016 | |
| KR | 10-0170843 | | 3/1999 | |
| KR | 10-2003-0068298 | | 8/2003 | |
| KR | 20030068298 | | 8/2003 | |
| WO | WO-2013069618 A1 | * | 5/2013 | F16K 31/04 |

OTHER PUBLICATIONS

Extended European Search Report, issued in the corresponding European patent application No. 19844254.3, dated Mar. 29, 2022, 12 pages.

* cited by examiner

SERVICE CONNECTION VALVE ASSEMBLY

FIELD

This technical disclosure relates to service connection valve assemblies useable on systems such as air conditioning units, refrigeration units, freezer units and like systems that provide access to the systems for fluid processing.

BACKGROUND

U.S. Pat. Nos. 6,050,295 and 6,901,947, and U.S. Patent Application Publication No. 2002/066487, disclose examples of service connection valves that can be used on air conditioning and refrigeration units and that provide a high rate of flow through the service connection valve during servicing.

SUMMARY

A simplified service connection valve assembly is described that provides access to a fluid system, including but not limited to appliances that use refrigerant such as air conditioning units, freezer units, refrigeration units and like systems, for fluid processing through the service connection valve assembly. Fluid processing through the service connection valve assembly described herein can occur during manufacturing or assembly of the system. For example, in the case of an appliance that uses a refrigerant, the service connection valve assembly allows assembly personnel to remove all water, purge all air, perform leak detection, and/or fill refrigerant in the refrigerant loop of the appliance during the assembly of the appliance. In addition, after the appliance is installed, the service connection valve assembly allows service personnel to perform service processing on the appliance such as filling refrigerant in or removing refrigerant from the refrigerant loop of the appliance.

The service connection valve assembly described herein has a minimal number of parts, and is lower in cost, compared to other service connection valve assemblies such as those disclosed in U.S. Pat. Nos. 6,050,295 and 6,901,947 and in U.S. Patent Application Publication No. 2002/066487. In addition, the service connection valve assembly described herein is designed to provide a high flow rate with minimal or no pressure drop.

The service connection valve assembly can include a generally cylindrical valve body and a generally cylindrical valve core received in the generally cylindrical valve body. The generally cylindrical valve core is movable relative to the generally cylindrical valve body in a direction parallel to the longitudinal axis between a closed position preventing fluid flow through the service connection valve assembly and an open position allowing fluid flow through the service connection valve assembly. At the closed position, a metal-to-metal seal is created between the generally cylindrical valve body and the generally cylindrical valve core which creates a seal to prevent fluid flow through the service connection valve assembly.

In one embodiment, the service connection valve assembly consists of just the generally cylindrical valve body and the generally cylindrical valve core; no other elements separate from the generally cylindrical valve body and the generally cylindrical valve core are present. In this embodiment, the service connection valve assembly does not include an elastomeric sealing element. For example, in the service connection valve assembly, there is no elastomeric sealing element that seals between the generally cylindrical valve body and the generally cylindrical valve core when the generally cylindrical valve core is at the closed position or at an open position, and there is no biasing spring or other biasing member acting on the generally cylindrical valve core. In this embodiment, the service connection valve assembly may include a hard stop configured to limit movement of the valve core toward the valve seat. In this embodiment, the hard stop comprises a first stop surface on the valve core and a second stop surface on the valve body.

In another embodiment, the service connection valve assembly consists essentially of the generally cylindrical valve body and the generally cylindrical valve core. In this embodiment, the service connection valve assembly may include one or more additional elements that do not materially affect the basic and novel characteristics of the service connection valve assembly described herein. For example, the service connection valve assembly can include one or more of an elastomeric sealing element that seals between the generally cylindrical valve body and the generally cylindrical valve core, for example when the generally cylindrical valve core is at the closed position and/or the service connection valve assembly can include a biasing spring acting on the generally cylindrical valve core to bias the generally cylindrical valve core toward an open position.

In one embodiment described herein, a service connection valve assembly consists of a generally cylindrical valve body and a generally cylindrical valve core. The generally cylindrical valve body has a first open end and a second open end, an interior surface defining a passageway extending along a longitudinal axis from the first open end to the second open end, a valve seat within the generally cylindrical valve body through which the passageway extends, and threads on a portion of the interior surface between the first open end and the second open end. The generally cylindrical valve core is disposed within the passageway of the generally cylindrical valve body and is movable relative to the generally cylindrical valve body in a direction parallel to the longitudinal axis between a closed position where the generally cylindrical valve core is in sealing engagement with the valve seat preventing fluid flow through the service connection valve assembly and an open position where the generally cylindrical valve core is not engaged with the valve seat allowing fluid flow through the service connection valve assembly. In addition, the generally cylindrical valve core includes an exterior surface with threads that are engaged with the threads on the portion of the interior surface when the generally cylindrical valve core is at the closed position. As the valve core is moved closer to the valve seat, the flow through the valve assembly becomes more and more restricted until eventually the valve core reaches the closed position preventing fluid flow through the valve assembly. In addition, as the valve core moves further and further away from the valve seat, the flow through the valve assembly becomes less and less restricted until eventually the valve core reaches a fully open position that allows maximum flow through the valve assembly.

In another embodiment described herein, a service connection valve assembly consists essentially of a generally cylindrical valve body and a generally cylindrical valve core. The generally cylindrical valve body has a first open end and a second open end, an interior surface defining a passageway extending along a longitudinal axis from the first open end to the second open end, a valve seat within the generally cylindrical valve body through which the passageway extends, and threads on a portion of the interior surface between the first open end and the second open end. The generally cylindrical valve core is disposed within the passageway of the generally cylindrical valve body and is movable relative to the generally cylindrical valve body in a direction parallel to the longitudinal axis between a closed position where the generally cylindrical valve core is in sealing engagement with the valve seat preventing fluid flow through the service connection valve assembly and an open position where the generally cylindrical valve core is not engaged with the valve seat allowing fluid flow through the service connection valve assembly. The generally cylindrical valve core further includes an exterior surface with threads that are engaged with the threads on the portion of the interior surface when the generally cylindrical valve core is at the closed position. Optionally, an elastomeric sealing element can be provided that seals between the generally cylindrical valve body and the generally cylindrical valve core.

In another embodiment described herein, a service connection valve assembly comprises a generally cylindrical valve body and a generally cylindrical valve core. The generally cylindrical valve body has a first open end and a second open end, an interior surface defining a passageway extending along a longitudinal axis from the first open end to the second open end, a valve seat within the generally cylindrical valve body through which the passageway extends, and threads on a portion of the interior surface between the first open end and the second open end. The generally cylindrical valve core is disposed within the passageway of the generally cylindrical valve body and is movable relative to the generally cylindrical valve body in a direction parallel to the longitudinal axis between an open position where the generally cylindrical valve core is not engaged with the valve seat allowing fluid flow through the service connection valve assembly and a closed position where the generally cylindrical valve core is in sealing engagement with the valve seat preventing fluid flow through the service connection valve assembly. The generally cylindrical valve core further includes an exterior surface with threads that are engaged with the threads on the portion of the interior surface when the generally cylindrical valve core is at the closed position. In addition, a metal-to-metal seal is formed between the valve seat and the generally cylindrical valve core when the generally cylindrical valve core is at the closed position.

DRAWINGS

DETAILED DESCRIPTION

Figure 1:
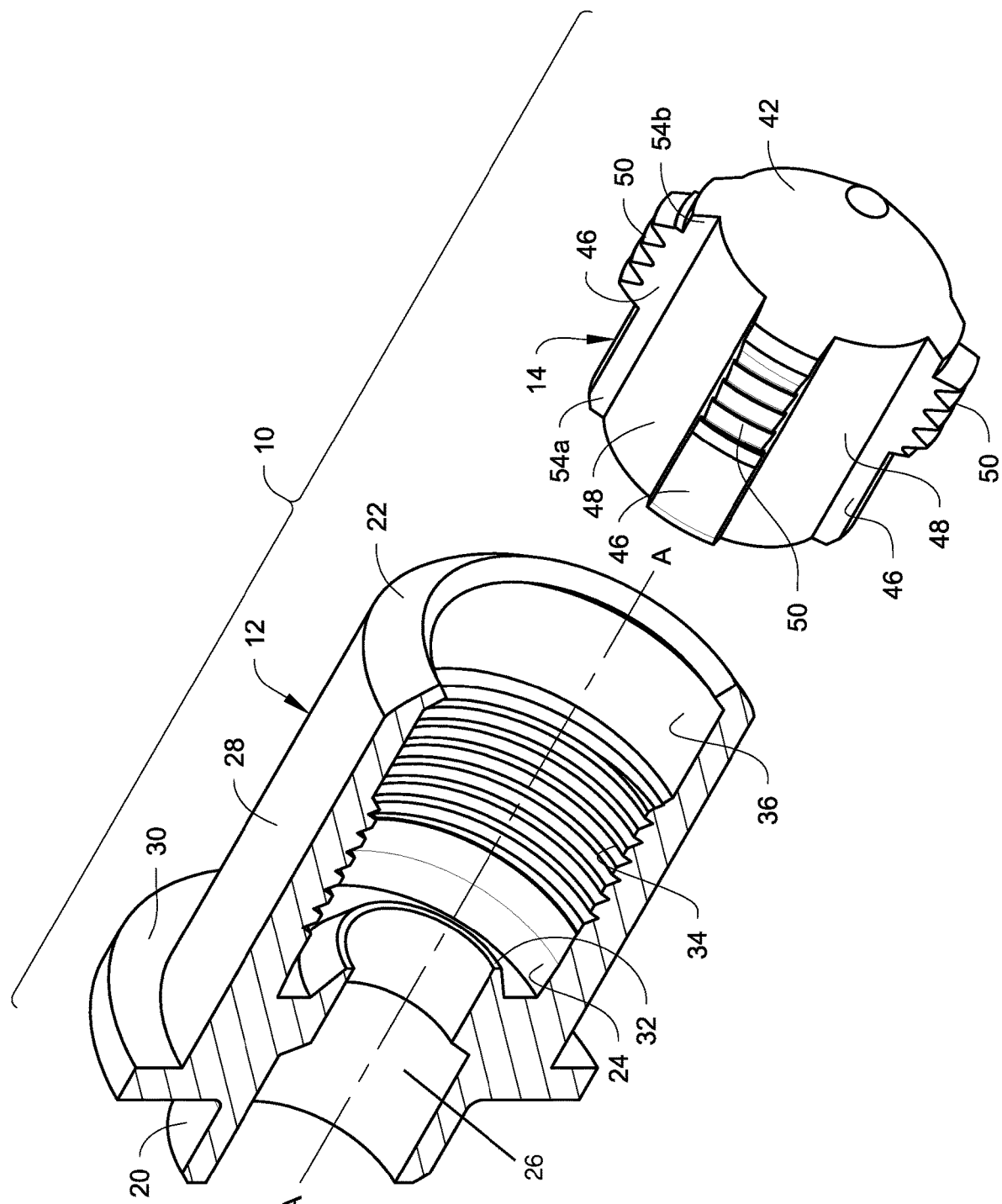
FIG. 1 is a perspective view of a service connection valve assembly described herein having a generally cylindrical valve body (shown in cross-section) and a generally cylindrical valve core, with the valve core removed from the valve body.

An embodiment of a service connection valve assembly 10 is illustrated in FIGS. 1-6. The service connection valve assembly 10 is illustrated as consisting of a generally cylindrical valve body 12 and a generally cylindrical valve core 14. However, in other embodiments, the service connection valve assembly 10 can consist essentially of the generally cylindrical valve body 12 and the generally cylindrical valve core 14, or the service connection valve assembly 10 can comprise the generally cylindrical valve body 12 and the generally cylindrical valve core 14.

Referring to FIGS. 1-4, the valve body 12 is a generally cylindrical structure having a longitudinal axis A-A, a first open end 20 and a second open end 22 opposite the first open end 20, and an interior surface 24 defining a passageway 26 extending along the longitudinal axis A-A from the first open end 20 to the second open end 22. The first open end 20 is configured to be attached to the system or appliance that the valve assembly 10 is to be used with, and a fluid is intended to flow from or into the second open end 22 during a processing operation through the valve assembly 10. In the illustrated example, an exterior surface 28 of the valve body 12 includes a radial flange 30 projecting therefrom which acts as a stop to limit insertion of the first open end 20 of the valve body 12 into the system/appliance. Once the valve body 12 is inserted into the system/appliance, the valve body 12 is suitably fastened to the system/appliance. For example, if the valve body 12 is made of a metal material such as brass, the first open end 20 may be brazed to the system/appliance. However, the valve body 12 may be made from other materials, such as plastic, and in other embodiments the first open end 20 may be fastened to the system/appliance using adhesive or using a mechanical fastening system involving one or more mechanical fasteners. Preferably, the first open end 20 is fastened to the system/appliance in a manner to provide a fluid tight seal between the valve body 12 and the system/appliance to prevent fluid leakage.

Figure 2:
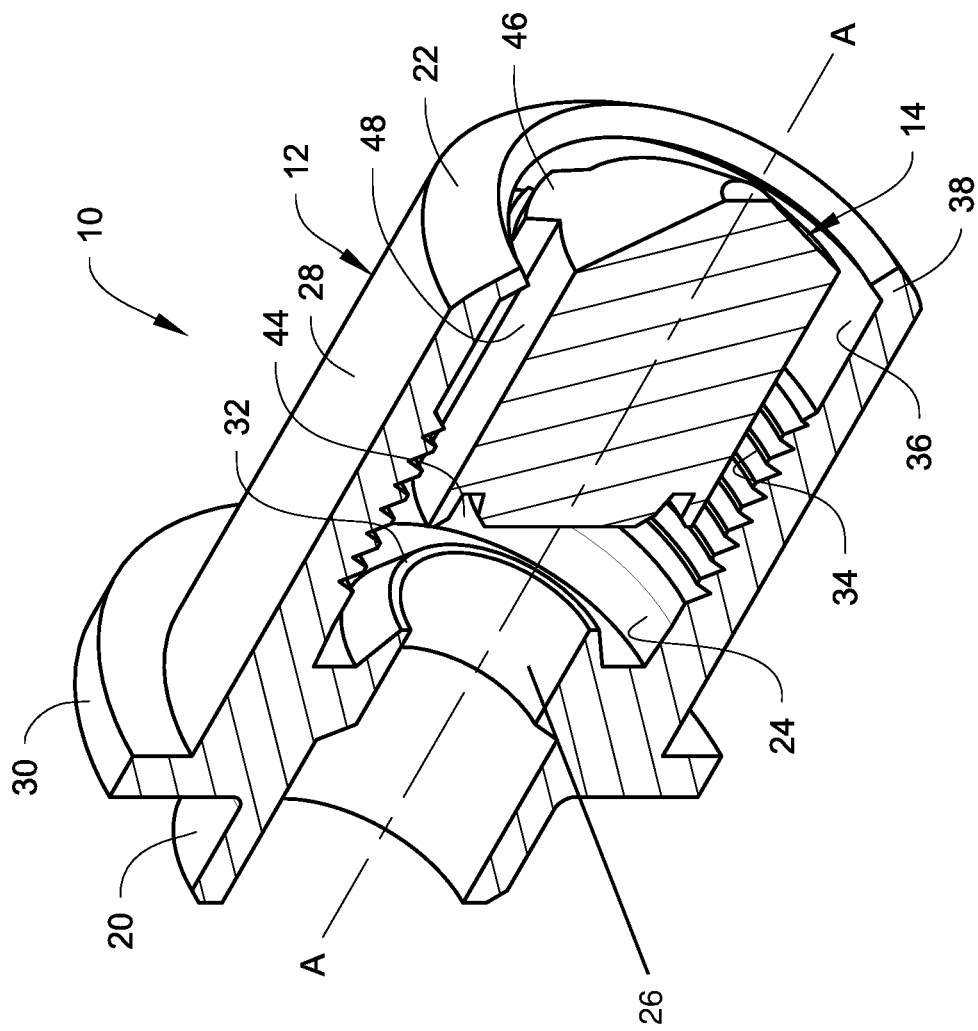
FIG. 2 is a perspective longitudinal cross-sectional view of the service connection valve assembly in FIG. 1 with the valve core installed within the valve body.
Figure 3:
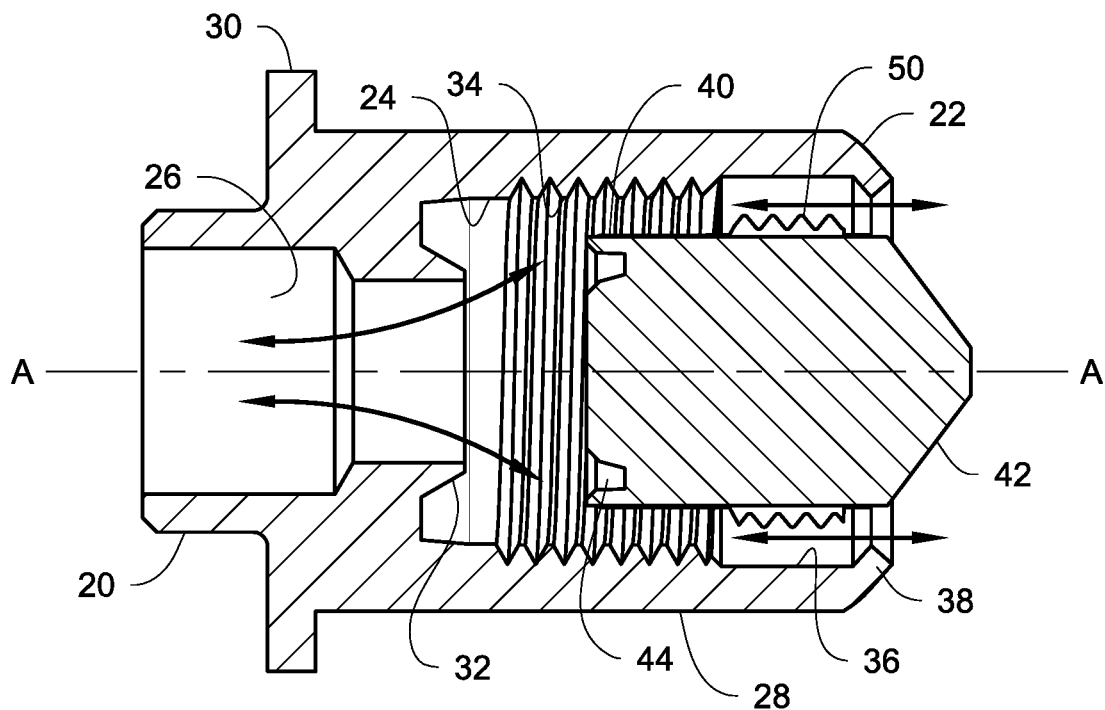
FIG. 3 is a longitudinal cross-sectional view of the service connection valve assembly of FIG. 2 taken along line 3-3 in FIG. 6 with the valve core in a fully open position.

Referring to FIGS. 1-3, a valve seat 32 is defined within the valve body 12 through which the passageway 26 extends. The valve core 14 is configured to engage with the valve seat 32 at the closed position of the valve core 14 and form a fluid-tight seal therewith to prevent fluid flow through the passageway 26. The valve seat 32 is illustrated as being circular or substantially circular. However, the valve seat 32 can have any shape and configuration that allows fluid-tight sealing between the valve seat 32 and the valve core 14 preventing flow through the passageway 26 at the closed position of the valve core 14. The valve seat 32 is shown as being positioned closer to the first open end 20 than to the second open end 22. However, other locations of the valve seat 32 are possible.

As best seen in FIGS. 1-4, interior threads 34 are formed on a portion of the interior surface 24 at a position suitable to engage with threads (described below) formed on the valve core 14 to permit adjustment of the valve core 14 relative to the valve body 12 from an open position to the closed position. An open position of the valve core 14 is any position of the valve core 14 where the valve core 14 is unseated from the valve seat 32 (any time the valve core 14 is not in the closed position) since fluid can flow through the valve assembly 10. As the valve core 14 is moved in a direction further and further away from the valve seat 32, the flow through the valve assembly 10 becomes less and less restricted until eventually the valve core 14 reaches a fully open position, shown in FIGS. 2 and 3, that allows maximum flow through the valve assembly 10. Further, as the valve core 14 is moved closer and closer to the valve seat 32, the flow through the valve assembly 10 becomes more and more restricted until eventually the valve core 14 reaches the closed position where the valve core 14 seals with the valve seat 32 preventing fluid flow through the valve assembly 10.

In the illustrated example, the threads 34 are circumferentially continuous and are formed on the interior surface 24 for example at a position located between the first open end 20 and the second open end 22, or at a position located between the valve seat 32 and the second open end 22. However, the threads 34 can be located at other positions as described in other embodiments below.

Referring to FIGS. 2 and 3, the interior surface 24 further includes an unthreaded section 36 that is located between the threads 34 and the second open end 22. The unthreaded section 36 forms a section where the valve core 14 can be received within the valve body 12 without the threads on the valve core 14 engaging with the threads 34 (as illustrated in FIG. 3). Instead, the threads on the valve core 14 face the unthreaded section 36. The unthreaded section 36 is beneficial is facilitating assembly of the valve core 14 into the valve body 12. During assembly, the valve core 14 can be placed into the valve body 12 and then the valve core 14 can be secured within the valve body 12. In an alternative embodiment, the threads 34 can extend all the way to or near the second open end 22. In such an embodiment, during assembly the valve core 14 would have to be threaded into the valve body 12 and then the valve core 14 can be secured within the valve body 12.

In one embodiment, the valve assembly 10 is provided to a customer assembled like illustrated in FIG. 3 with the valve core 14 within the valve body 12, and the second open end 22 coined or deformed inward to form an inward extending lip 38. Providing the valve core 14 within the valve body 12 helps to prevent damage to the threads on the valve core 14 and prevent damage to the valve seat 32 and prevent damage to the corresponding sealing surface on the valve core 14 prior to use. To install the valve core 14, the second open end 22 is initially uncoined or not deformed radially inward to permit installation of the valve core 14 through the second open end 22. Once the valve core 14 is inserted, the second open end 22 can then be coined or deformed inward to form the lip 38 which retains the valve core 14 in the valve body 12.

The valve core 14 comprises a generally solid, generally cylindrical member that can be actuated back and forth between an open position, such as a fully open position shown in FIG. 3, and the closed or sealing position (FIG. 4) to control flow through the valve assembly 10. The valve core 14 can have any configuration that is suitable for achieving the functions of the valve core 14 described and/or illustrated herein. For example, in FIGS. 1-4, the valve core 14 is shown as including a first or sealing end 40 and a second or actuating end 42.

Figure 4:
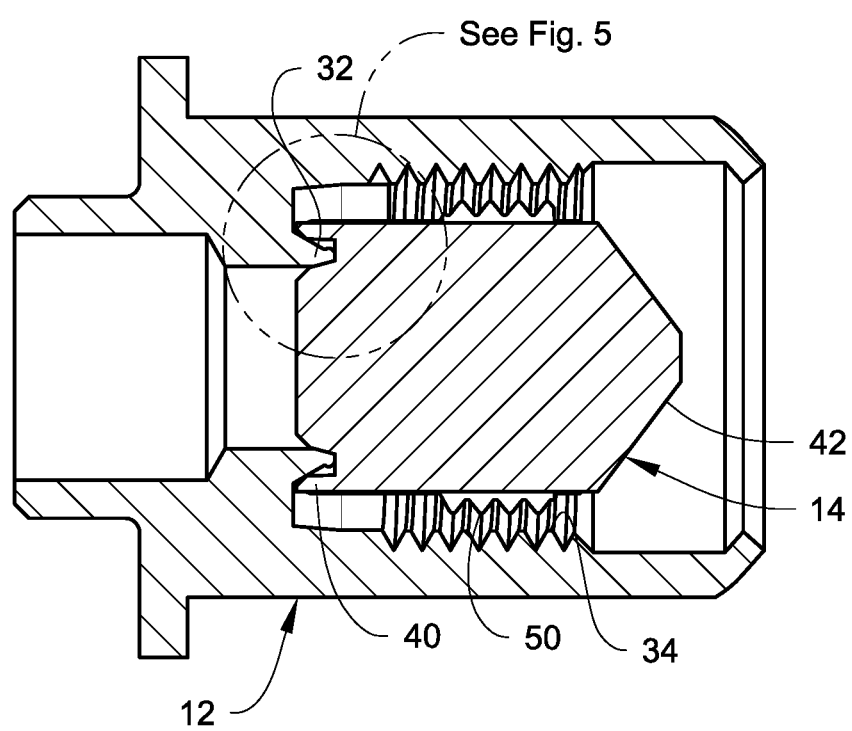
FIG. 4 is a longitudinal cross-sectional view of the service connection valve assembly similar to FIG. 3 but with the valve core in a closed position.
Figure 5:
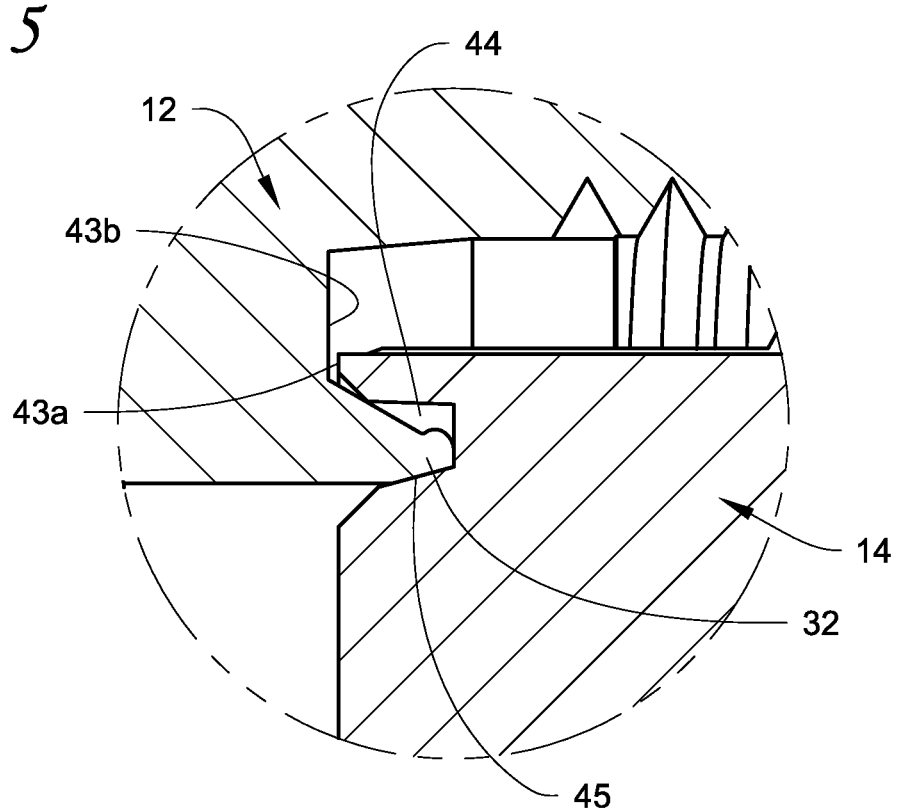
FIG. 5 is a close-up view of the area contained in circle 5 in FIG. 4.

The end 40 includes a groove or channel 44 that, in the closed position of the valve core 14 shown in FIG. 4, receives the valve seat 32 and defines at least one sealing surface 45 that seals with the valve seat 32 to prevent fluid flow through the valve assembly 10. In the illustrated example in FIGS. 4 and 5, the valve seat 32 is intended to be deformable so that the end of the valve seat 32 is deformed upon engagement with the valve core 14 in the groove 44. FIGS. 4 and 5 illustrate the end of the valve seat 32 deforming radially outward which occurs when the valve core 14 is initially actuated to the closed position to engage with the valve seat 32 which in some embodiments is initially not deformed. The deformation of the valve seat 32 helps to create a material-to-material seal between the valve seat 32 and the at least one sealing surface 45 of the valve core 14 within the groove 44 so that the valve core 14 seals with the valve seat 32 to prevent fluid flow past the valve core 14 when the valve core 14 is at the closed position shown in FIGS. 4 and 5.

In addition, the valve body 12 and the valve core 14 are provided with a hard stop to prevent over-deformation of the valve seat 32 and allow re-use of the valve core 14. Referring to FIG. 5, the end 40 of the valve core 14 includes a first stop surface 43a and the interior of the valve body 12 includes a second stop surface 43b. The first stop surface 43a and the second stop surface 43b form a hard stop, whereby the first stop surface 43a is intended to come into contact with the second stop surface 43b to limit movement of the valve core 14 toward the left in FIGS. 4 and 5, thereby preventing over-deformation of the valve seat 32. The amount of deformation of the valve seat 32 is controlled by the distance between the first stop surface 43a on the valve core 14 and the second stop surface 43b on the valve body 12.

In one embodiment, the valve body 12, including the valve seat 32, and the valve core 14 can each be made of metal such as brass whereby a metal-to-metal seal is formed between the valve seat 32 and the sealing surface 45 at the closed position of the valve core 14 shown in FIGS. 4 and 5. In another embodiment, some or all of the valve seat 32 that is intended to be in contact with the sealing surface 45 at the closed position, and the sealing surface 45 of the valve core 14 intended to be in contact with the valve seat 32 at the closed position, can be made of metal such as brass, while the other portions of the valve body 12 and the valve core 14 are made of different materials, whereby a metal-to-metal seal is formed between the valve seat 32 and the sealing surface 45 at the closed position of the valve core 14 shown in FIGS. 4 and 5.

The end 42 of the valve core 14 is configured to be engaged by a suitable actuation tool (not shown) for rotating the valve core 14 to actuate the valve core 14 open and closed. In use, the actuation tool can grip the exterior surface 28 of the valve body 12, while another portion of the actuation tool can engage the end 42 of the valve core 14, for example by friction, to rotate the valve core 14 in the desired direction either in a clockwise direction or in a counter-clockwise direction to advance or retract the valve core 14. Actuation tools that could be used are similar to the actuation tools described in U.S. Pat. No. 6,901,947, the entire contents of which are incorporated herein by reference.

Figure 6:
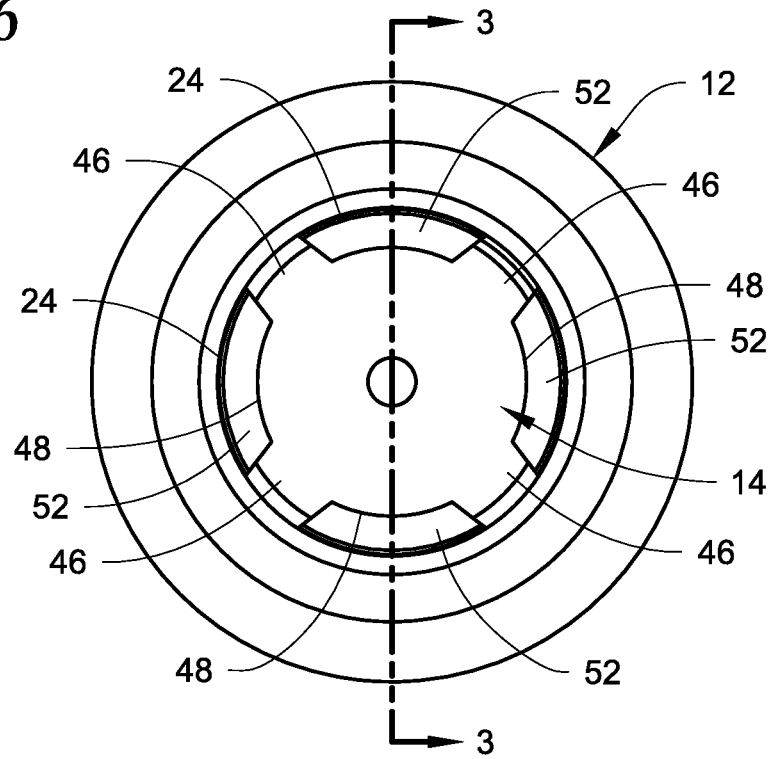
FIG. 6 is an end view of the service connection valve assembly of FIGS. 1-4.

Referring to FIGS. 1, 2 and 6, the valve core 14 further includes a plurality of circumferentially spaced arms 46 that extend radially from an exterior surface 48 thereof. FIG. 6 illustrates four of the arms 46 evenly circumferentially spaced from one another around the exterior surface 48. However, a larger or smaller number of arms 46 can be used. In addition, the arms 46 needs not be evenly circumferentially spaced from one another. Radial outer surfaces of the arms 46 are provided with exterior threads 50 that are engageable with the threads 34 on the valve body 12. Accordingly, the threads 50 on the valve core 14 can be described as being discontinuous due to the spacing between the arms 46. Upon rotation of the valve core 14 in the desired direction, the engagement between the threads 34, 50 causes the movement of the valve core 14 relative to the valve body 12 to advance or retract the valve core 14 in a direction parallel to the longitudinal axis A-A.

In the illustrated example, the arms 46 extend at least a majority of the length of the valve core 14. For example, the arms 46 can extend from a first end 54a at or near the first end 40 to a second end 54b at or near the second end 42. However, the arms 46 can have other lengths. The threads 50 extend along only a portion of the length of the arms 46 between the ends 54a, 54b.

Referring to FIGS. 2, 3 and 6, fluid flow passageways 52 are defined between each pair of adjacent arms 46, the exterior surface 48 between the adjacent arms 46, and the interior surface 24 of the valve body 12. The passageways 52 permit fluid to flow past the valve core 14 when the valve core 14 is not sealed with the valve seat 32, as indicated by the arrows in FIG. 3. In one embodiment, the passageways 52 are configured to minimize pressure drop and maintain the flow of the fluid. For example, the combined area of the passageways 52 can be selected to be substantially equal to the area of the passageway 26 through the valve seat 32. When the valve core 14 is actuated to the fully open position show in FIG. 3 with the threads 50 located at the unthreaded section 36, the valve core 14 is held in place by the unthreaded section 36 of the valve body 12 (i.e. the valve core 14 is not moved significantly to the left or to the right in FIG. 3) so the valve core 14 is not significantly moved in either direction when fluid flow is occurring around the valve core 14.

In the embodiment in FIGS. 1-6, the valve body 12 is a single piece construction, and the valve core 14 is a single piece construction. Sealing is achieved by the material-to-material seal between the valve body 12 and the valve core 14. There is no elastomeric sealing element on either the valve body 12 or on the valve core 14 that seals between the valve body 12 and the valve core 14. In addition, there is no biasing spring or other biasing member acting on the valve core 14. However, in other embodiments, an elastomeric sealing element on either the valve body 12 or on the valve core 14 that seals between the valve body 12 and the valve core 14 to prevent fluid flow at the closed position of the valve core 14 may be provided and/or a biasing spring or other biasing member that acts on the valve core 14 may be provided. As discussed further below, if a biasing spring is provided, the biasing springs acts to bias the valve core 14 toward the fully open position shown in FIGS. 2 and 3 rather than biasing the valve core 14 toward the closed position as in a traditional valve.

In addition, the valve core 14 is retained within the valve body 12 by the lip 38. As a result, in the illustrated embodiment, the valve core 14 is not intended to be removable from the valve body 12. However, in other embodiments, the valve core 14 could be intended to be removable from the valve body 12. For example, one could remove the lip 38 by deforming the end 22 back out to remove the coined lip 38. Alternatively, instead of the lip 38, a removable retaining ring, such as a snap ring on the interior surface 24, could be used at or near the end 22 of the valve body 12 to retain the valve core 14 within the valve body 12. When the retaining ring is removed, that would permit removal of the valve core 14 via the end 22.

At the closed position of the valve core 14, the sealing surface 45 is sealed with the valve seat 32 preventing flow through the valve assembly 10 and the threads 34 are engaged with the threads 50. As the valve core 14 is actuated away from the valve seat 32, fluid can begin flowing through the valve assembly 10. So an open position of the valve core 14 can be considered any position of the valve core 14 where the valve core 14 is unseated from the valve seat 32 (any time the valve core 14 is not in the closed position). However, as the valve core 14 is moved in a direction further and further away from the valve seat 32, the flow through the valve assembly 10 becomes less and less restricted. The position of the valve core 14 illustrated in FIGS. 2 and 3 can be referred to as a fully open position that allows maximum flow through the valve assembly 10. However, maximum flow through the valve assembly 10 may also occur with the valve core 14 at other open positions between the closed position and the fully open position. The threads 50 on the valve core 14 may or may not be engaged with the internal threads 34 on the valve body 12 at a maximum flow position of the valve core 14.

Figure 7:
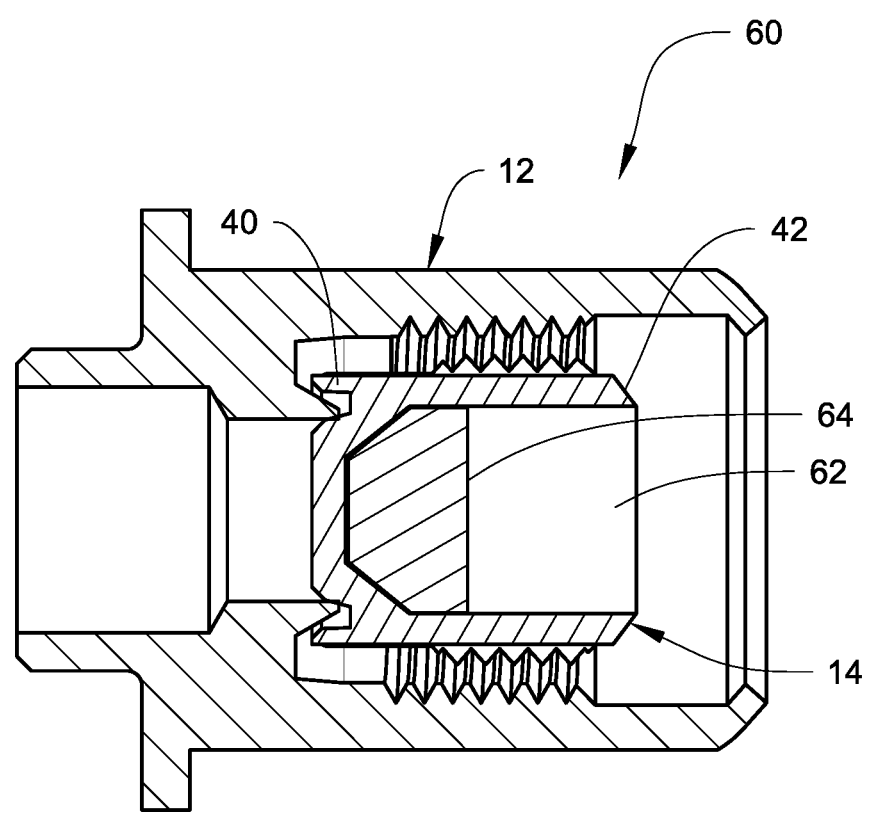
FIG. 7 is a longitudinal cross-sectional view of another embodiment of a service connection valve assembly described herein.

FIG. 7 illustrates another embodiment of a service connection valve assembly 60. The valve assembly 60 is similar to the valve assembly 10 and like elements are referenced using the same reference numerals. The valve assembly 60 is illustrated as consisting of the generally cylindrical valve body 12 and the generally cylindrical valve core 14. However, in other embodiments, the valve assembly 60 can consist essentially of the generally cylindrical valve body 12 and the generally cylindrical valve core 14, or the valve assembly 60 can comprise the generally cylindrical valve body 12 and the generally cylindrical valve core 14.

The valve assembly 60 differs from the valve assembly 10 in that the valve core 14 is made generally hollow starting from the end 42 and extending toward, but stopping short of, the end 40 to form an interior void 62 in the valve core 14. The void 62 permits placement of a sensor element 64, such as a magnet or an RFID tag, that allows tracking of movement of the valve core 14, or allows tracking of the valve assembly 10 itself. The sensor element 64 could alternatively be configured as, or an additional sensor element can be provided that is configured as, a pressure sensor that monitors the internal pressure of the valve assembly 10. As illustrated in FIG. 7, the end of the void 62 can be left open during use, or the void 62 can be closed by a cap or plug (not shown) that is fixed to the valve core 14, or the remainder of the void 62 can be filled with a potting material once the sensor element(s) 64 is in place.

Figure 8:
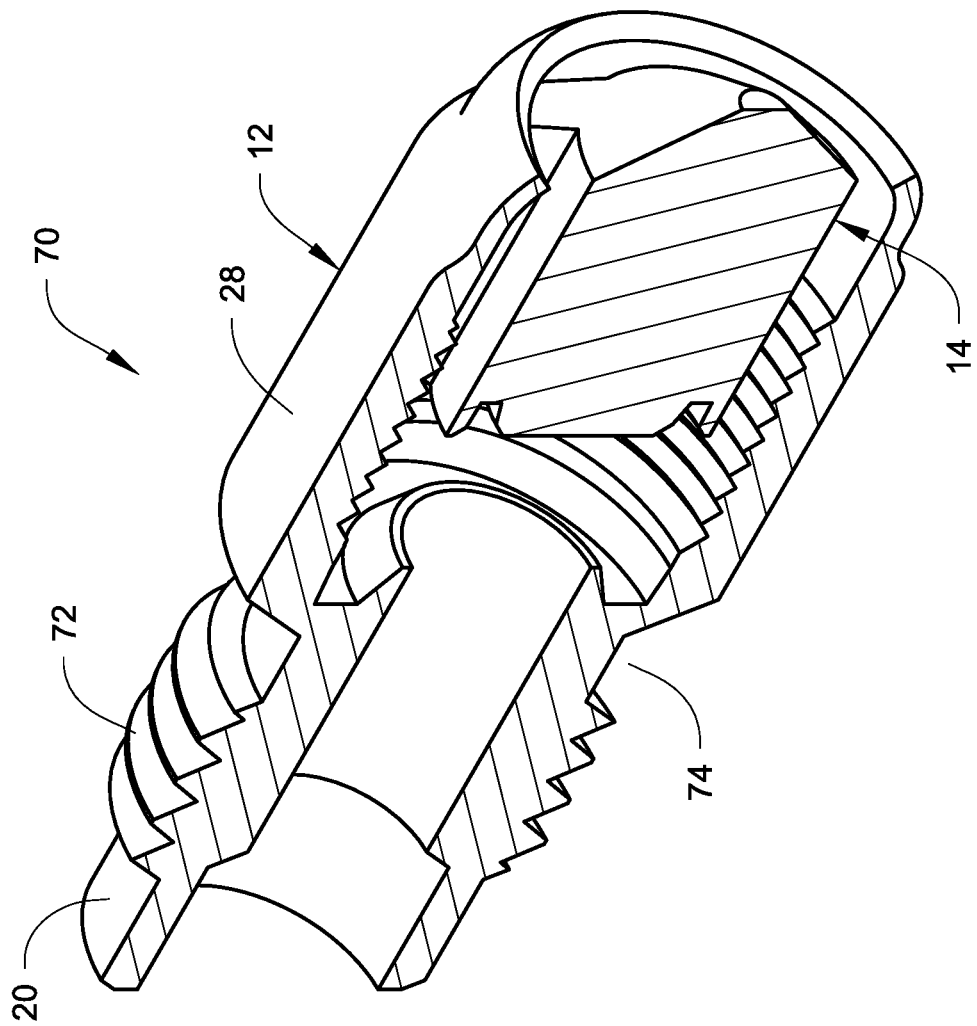
FIG. 8 is a perspective longitudinal cross-sectional view of another embodiment of a service connection valve assembly described herein.

FIG. 8 illustrates another embodiment of a service connection valve assembly 70. The valve assembly 70 is similar to the valve assembly 10 and like elements are referenced using the same reference numerals. The valve assembly 70 is illustrated as consisting of the generally cylindrical valve body 12 and the generally cylindrical valve core 14. However, in other embodiments, the valve assembly 70 can consist essentially of the generally cylindrical valve body 12 and the generally cylindrical valve core 14, or the valve assembly 70 can comprise the generally cylindrical valve body 12 and the generally cylindrical valve core 14.

The valve assembly 70 differs from the valve assembly 10 in that the first open end 20 of the valve body 12 is provided with threads 72 whereby the first open end 20 is configured to be attached to the system or appliance that the valve assembly 70 is to be used with via the threads 72 (and corresponding threads on the system or appliance). The valve body 12 in FIG. 8 is also illustrated as not including the radial flange 30. However, the radial flange 30 could be used on the valve body 12 in FIG. 8 if desired. A channel 74 is formed in the exterior surface 28 of the valve body 12 adjacent to the threads 72. The channel 74 permits the actuation tool used to actuate the valve core 14 to latch onto the valve body 12, for example using a latching ball-type connector known in the art.

Figure 9:
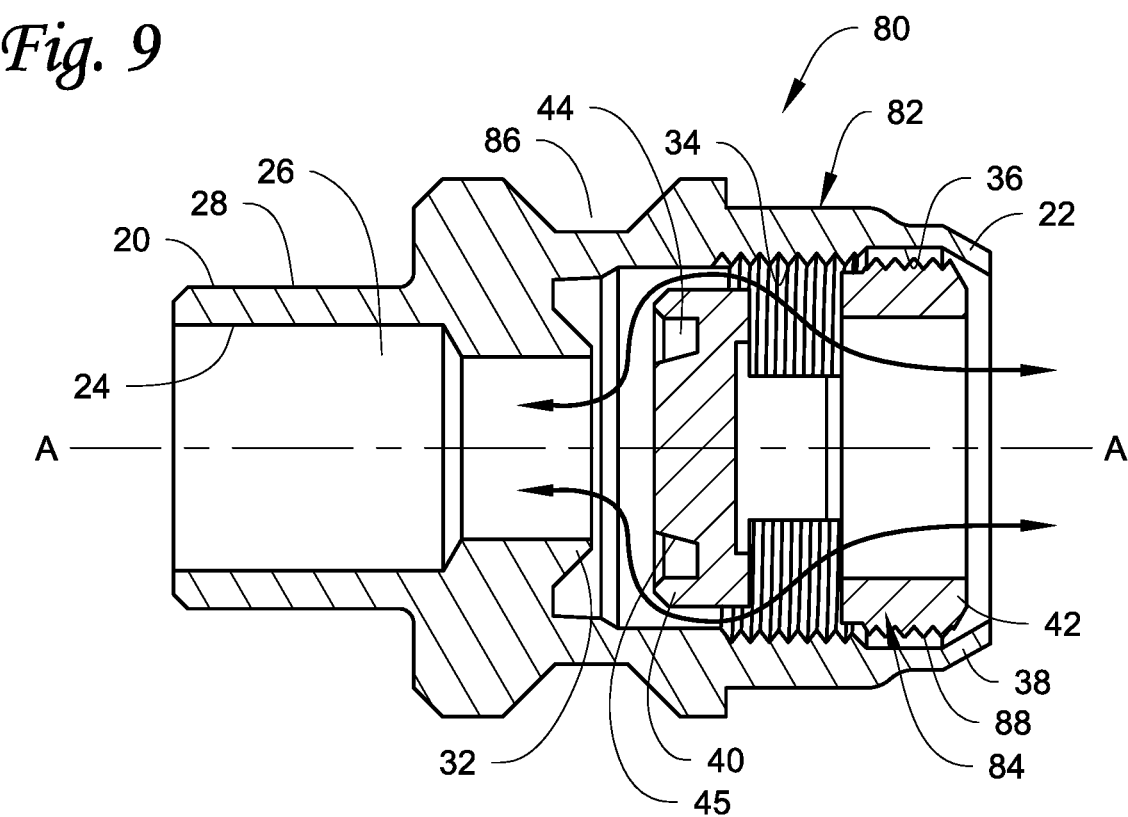
FIG. 9 is a longitudinal cross-sectional view of another embodiment of a service connection valve assembly described herein with the valve core in a fully open position.
Figure 10:
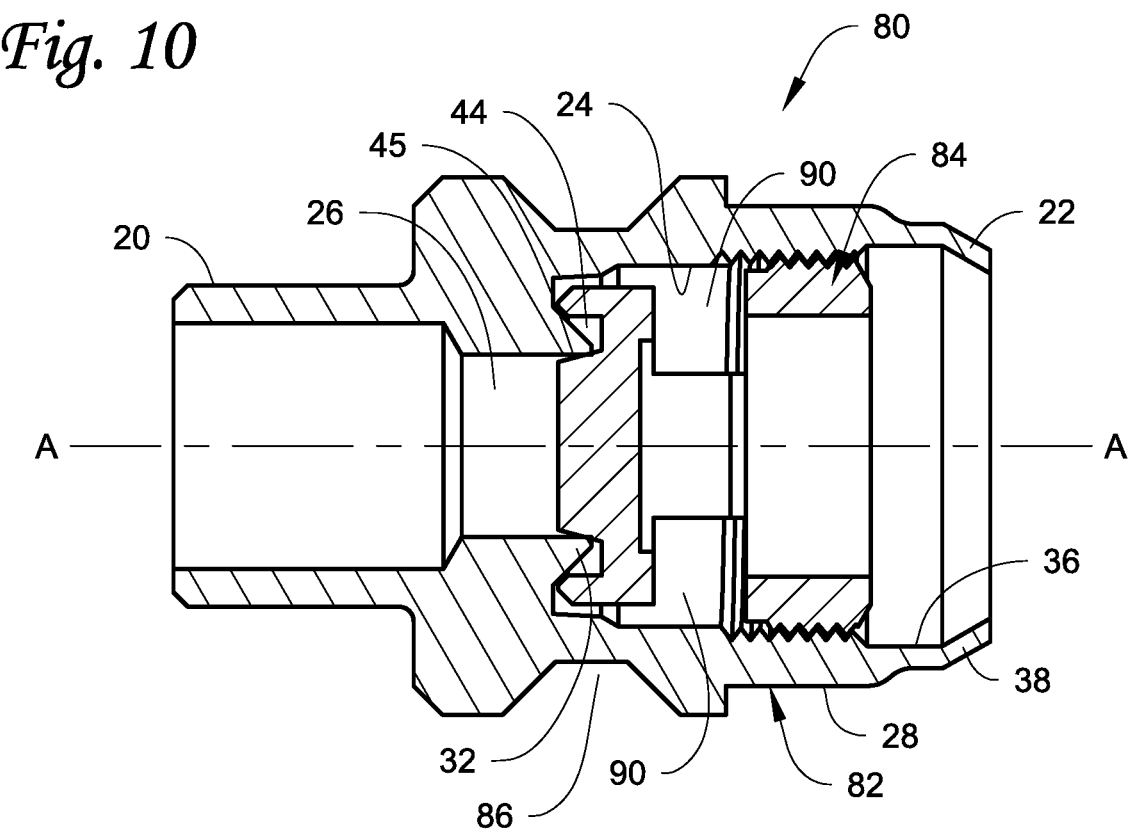
FIG. 10 is a longitudinal cross-sectional view of the service connection valve assembly of FIG. 9 but with the valve core in a closed position.
Figure 11:
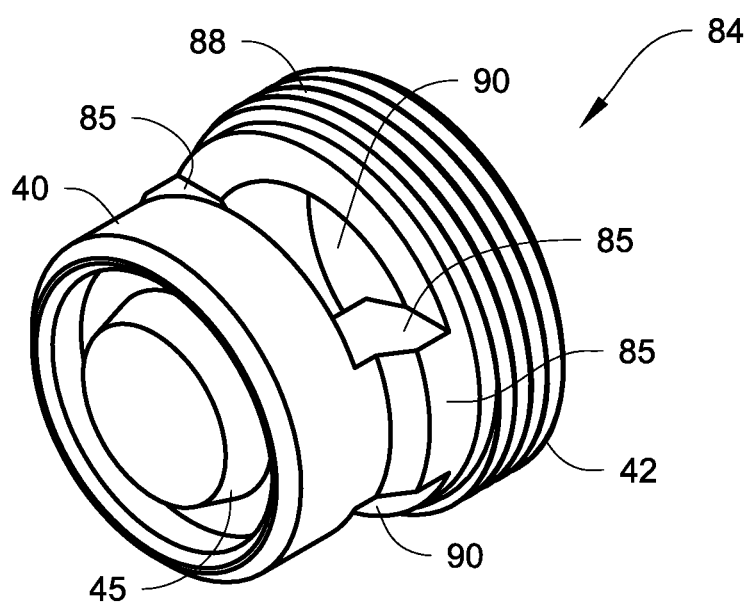
FIG. 11 is a perspective view of the valve core used with the service connection valve assembly of FIGS. 9 and 10.
Figure 12:
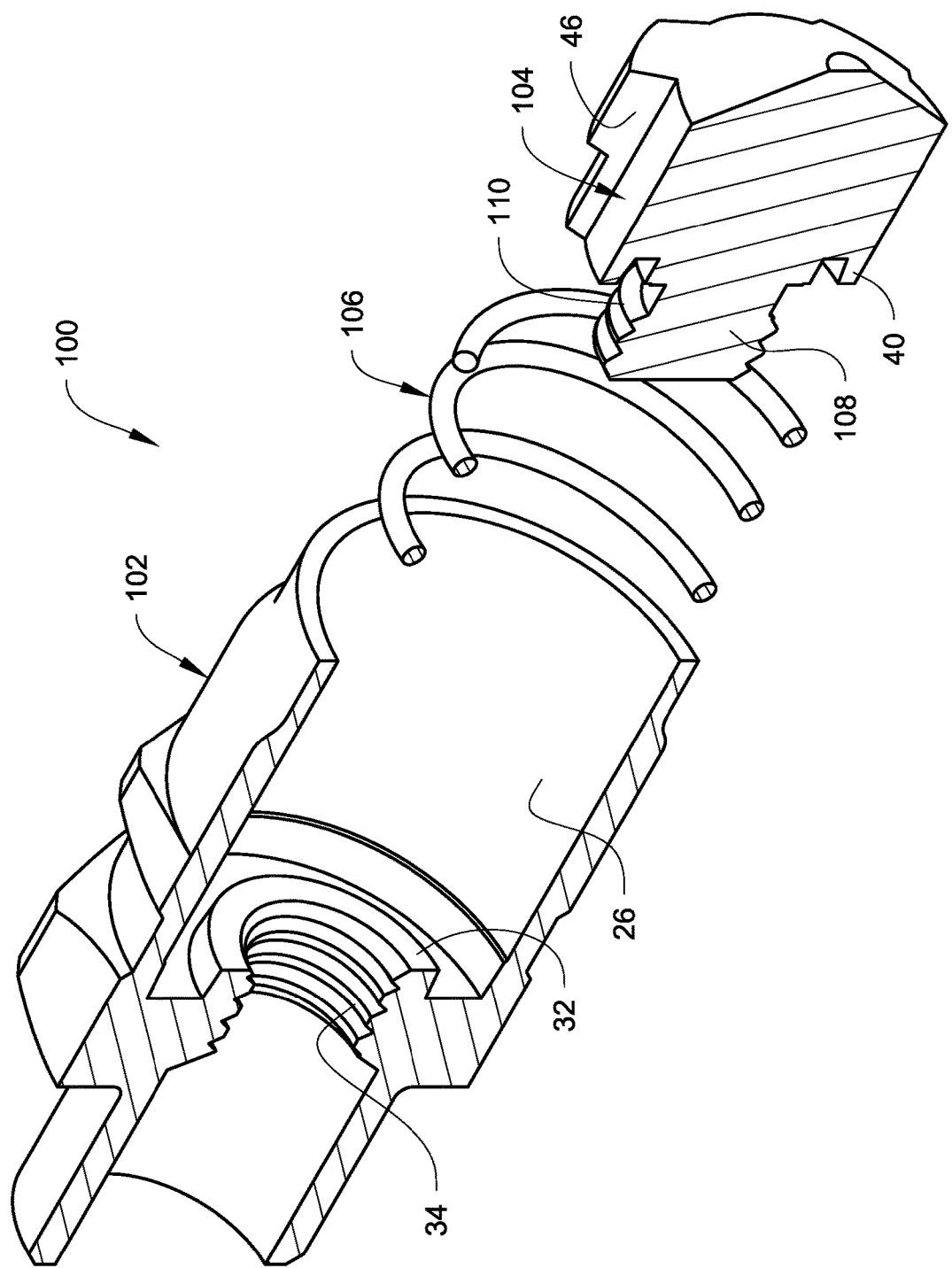
FIG. 12 is a perspective view of another embodiment of a service connection valve assembly described herein having a generally cylindrical valve body (shown in cross-section) and a generally cylindrical valve core (also shown in cross-section), with the valve core removed from the valve body.

FIGS. 9-11 illustrate another embodiment of a service connection valve assembly 80. The valve assembly 80 is similar to the valve assembly 10 and like elements are referenced using the same reference numerals. The valve assembly 80 is illustrated as consisting of a generally cylindrical valve body 82 and a generally cylindrical valve core 84. However, in other embodiments, the valve assembly 80 can consist essentially of the generally cylindrical valve body 82 and the generally cylindrical valve core 84, or the valve assembly 80 can comprise the generally cylindrical valve body 82 and the generally cylindrical valve core 84. In this embodiment, the valve core 84 is configured so that there is flow of fluid through at least a portion of the valve core 84.

Referring to FIGS. 9 and 10, the valve body 82 is a generally cylindrical structure having a longitudinal axis A-A, the first open end 20 and the second open end 22 opposite the first open end 20, and the interior surface 24 defining the passageway 26 extending along the longitudinal axis A-A from the first open end 20 to the second open end 22. The first open end 20 is configured to be attached to the system or appliance that the valve assembly 80 is to be used with, and a fluid is intended to flow from or into the second open end 22 during a processing operation through the valve assembly 80. In the illustrated example, the exterior surface 28 of the valve body 82 includes a circumferential detent groove 86 that the actuation tool used to actuate the valve core 84 can latch onto, for example using a latching ball-type connector known in the art. The valve body 82 can be secured to the system/appliance in a manner similar to the valve body 12 or by using threads. In an alternative embodiment, the valve body 82 can have a construction that is the same as the construction of the valve body in FIGS. 1-7 or the valve body in FIG. 8.

The valve seat 32 is defined within the valve body 12 through which the passageway 26 extends. In addition, the interior threads 34 are formed on a portion of the interior surface 24 at a position suitable to engage with threads (described below) formed on the valve core 14 to permit adjustment of the valve core 14 relative to the valve body 12 from an open position to the closed position. Further, the valve body 12 includes the unthreaded section 36 that is located between the threads 34 and the second open end 22. However, the unthreaded section 36 is not required and the threads 34 could extend to or near the end 22.

Referring to FIGS. 9-11, the valve core 84 is configured to be advanced or retracted relative to the valve body 82 between what can be referred to as a fully open position (FIG. 9) and a closed or sealing position (FIG. 10) to control flow through the valve assembly 80. The valve core 84 includes the first or sealing end 40 and the second or actuating end 42. The end 40 includes the groove or channel 44 that, in the closed position of the valve core 84 shown in FIG. 10, receives the valve seat 32 and defines the at least one sealing surface 45 that seals with the valve seat 32 to prevent fluid flow through the valve assembly 80. Like in the illustrated example in FIGS. 4 and 5, the valve seat 32 in FIGS. 9 and 10 is intended to be deformable so that the end of the valve seat 32 is deformed upon engagement with the valve core 84 in the groove 44 (the deformation of the valve seat 32 is not illustrated in FIGS. 9 and 10 for simplicity). The deformation of the valve seat 32 helps to create a material-to-material seal between the valve seat 32 and the at least one sealing surface 45 of the valve core 84 within the groove 44 so that the valve core 84 seals with the valve seat 32 to prevent fluid flow past the valve core 84 when the valve core 84 is at the closed position shown in FIG. 10. Over-deformation of the valve seat 32 can be prevented using the hard stop, i.e. the first and second stop surface 43*a*, 43*b*, described above in FIGS. 4-5.

In one embodiment, the valve body 82, including the valve seat 32, and the valve core 84 can each be made of metal such as brass whereby a metal-to-metal seal is formed between the valve seat 32 and the sealing surface 45 at the closed position of the valve core 84 shown in FIG. 10. In another embodiment, some or all of the valve seat 32 that is intended to be in contact with the sealing surface 45 at the closed position, and the sealing surface 45 of the valve core 84 intended to be in contact with the valve seat 32 at the closed position, can be made of metal such as brass, while the other portions of the valve body 82 and the valve core 84 are made of different materials, whereby a metal-to-metal seal is formed between the valve seat 32 and the sealing surface 45 at the closed position of the valve core 84 shown in FIG. 10.

The end 22 of the valve core 84 is formed with external threads 88 that in the illustrated example are circumferentially continuous. The threads 88 are engageable with the threads 34 on the valve body 82. Upon rotation of the valve core 84 in the desired direction (i.e. clockwise or counterclockwise when viewing the end of the valve core 84), the engagement between the threads 34, 88 causes the advancing or retraction movement of the valve core 84 relative to the valve body 82 in a direction parallel to the longitudinal axis A-A. The threads 88 extend along only a portion of the length of the valve core 84 between the ends of the valve core 84.

The valve core 84 is also generally hollow from the end 42 toward the end 40 stopping short of the end 40. A plurality of fluid passageways 90 are formed through the valve core 84 between the end of the threads 88 and the end 40 that communicate with the hollow interior of the valve core 84. In the example illustrated in FIGS. 9-11, there are at least two of the passageways 90, for example three of the passageways 90, and the passageways 90 are evenly circumferentially spaced around the valve core 84. In one embodiment, the flow path through and around the valve core 84 is configured to minimize pressure drop and maintain the flow of the fluid. For example, the area of the passageways 90 can be selected to be substantially equal to the hollow interior area of the valve core 84 as well as substantially equal to the area of the flow path 26 through the valve seat 32. In operation, when the valve core 84 is at the open position in FIG. 9, fluid can flow into the end 42 of the valve core 84, then out through the passageways 90, and then through the passageway 26 through the seat 32 to flow through the valve assembly 80. Alternatively, for fluid flowing in the opposite direction, fluid can flow inward through the passageways 90 in the valve core 84 and then out through the end 42.

The end 42 of the valve core 84 is configured to be engaged by a suitable actuation tool (not shown) for rotating the valve core 84 to advance and retract the valve core 84 relative to the valve body 82. In use, the actuation tool can latch onto the detent groove 86, while another portion of the actuation tool can engage the valve core 84 to rotate the valve core 84 in the desired direction either in a clockwise direction or in a counterclockwise direction to advance or retract the valve core 84. For example, as best seen in FIG. 11, the valve core 84 can include generally radial flats 85 and/or exterior flats 85 that are engageable by the actuation tool to rotate the valve core 84 relative to the valve body 82. Actuation tools that could be used are similar to the actuation tools described in U.S. Pat. No. 6,901,947, the entire contents of which are incorporated herein by reference.

The valve body 82 is a single piece construction, and the valve core 84 is also a single piece construction. Sealing is achieved by the material-to-material seal between the valve body 82 and the valve core 84. There is no elastomeric sealing element on either the valve body 82 or on the valve core 84 that seals between the valve body 82 and the valve core 84. In addition, there is no biasing spring or other biasing member acting on the valve core 84. However, in other embodiments, an elastomeric sealing element on either the valve body 82 or on the valve core 84 that seals between the valve body 82 and the valve core 84 when the valve core 84 is at the closed position may be provided and/or a biasing spring or other biasing member that acts on the valve core 84 may be provided. As discussed further below, if a biasing member is provided, the biasing member acts to bias the valve core 84 toward the fully open position shown in FIG. 9 rather than biasing the valve core 84 toward the closed position as in a traditional valve.

In addition, the valve core 84 can be retained within the valve body 82 by the lip 38. As a result, the valve core 84 is not intended to be removable from the valve body 82. However, in other embodiments, the valve core 84 could be intended to be removable from the valve body 82 in a similar as described above for the valve assembly 10 in FIGS. 1-6.

Operation of the valve assembly 80 is similar to the operation of the valve assembly 10 described above. At the closed position of the valve core 84, the sealing surface 45 is sealed with the valve seat 32 preventing flow through the valve assembly 80 and the threads 34 are engaged with the threads 88. As the valve core 84 is actuated away from the valve seat 32, fluid can begin flowing through the valve assembly 80. So an open position of the valve core 84 can be considered any position of the valve core 84 where the valve core 84 is unseated from the valve seat 32 (any time the valve core 84 is not in the closed position). However, as the valve core 84 is moved in a direction further and further away from the valve seat 32, the flow through the valve assembly 80 becomes less and less restricted. The position of the valve core 84 illustrated in FIG. 9 can be referred to as a fully open position that allows maximum flow through the valve assembly 80. However, maximum flow through the valve assembly 80 may also occur with the valve core 84 at other open positions between the closed position and the fully open position. The threads 88 on the valve core 84 may or may not be engaged with the internal threads 34 on the valve body 82 at a maximum flow position of the valve core 84.

Another embodiment of a service connection valve assembly 100 is illustrated in FIGS. 12-15. Elements that are similar to the valve assembly 10 or to the valve assembly 80 are referenced using the same reference numerals. In this embodiment, the valve assembly 100 includes a biasing member 106, for example a coil spring, that biases the valve core toward a fully open position. Therefore, in this embodiment, the valve assembly 100 is illustrated as consisting essentially of a generally cylindrical valve body 102 and a generally cylindrical valve core 104, together with the biasing member 106. However, in other embodiments, the valve assembly 100 can consist of the generally cylindrical valve body 102 and the generally cylindrical valve core 104 without the biasing member 106, or the valve assembly 100 can comprise the generally cylindrical valve body 102 and the generally cylindrical valve core 104, with or without the biasing member 106.

In the illustrated embodiment, the valve body 102 has a construction that is similar to the valve body 82 in FIGS. 9-10. However, in this embodiment, the interior threads 34 are located in a central passageway of the passageway 26 defining the valve seat 32. In another embodiment, the valve body 102 can have a construction that is similar to the valve body 12 but with the threads thereof located as in FIGS. 12-15.

Figure 14:
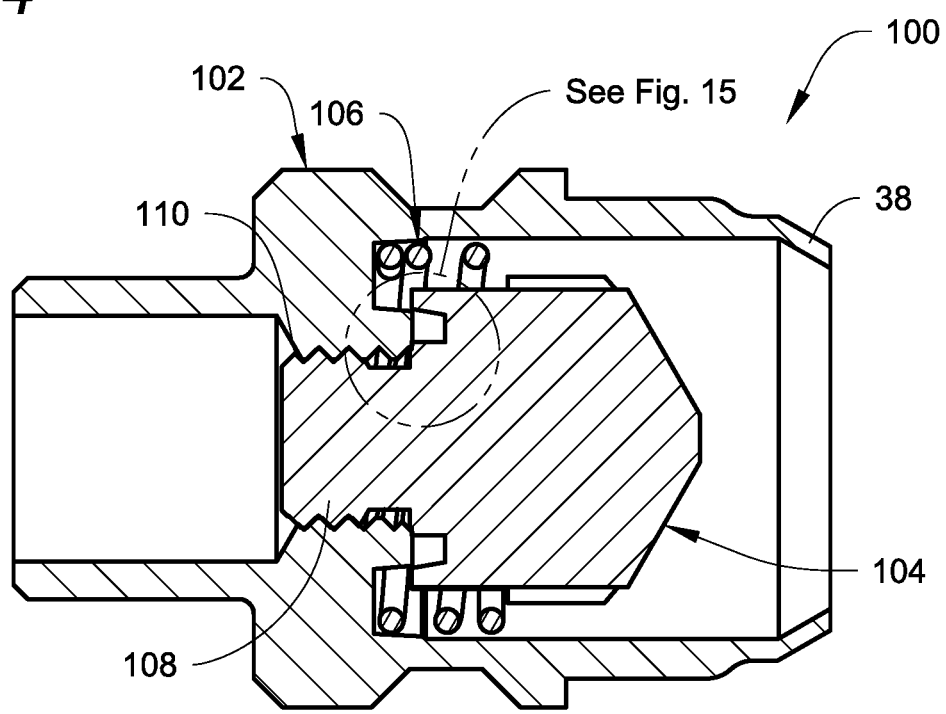
FIG. 14 is a longitudinal cross-sectional view of the service connection valve assembly of FIG. 12 in an assembled condition, but with the valve core in a closed position.
Figure 15:
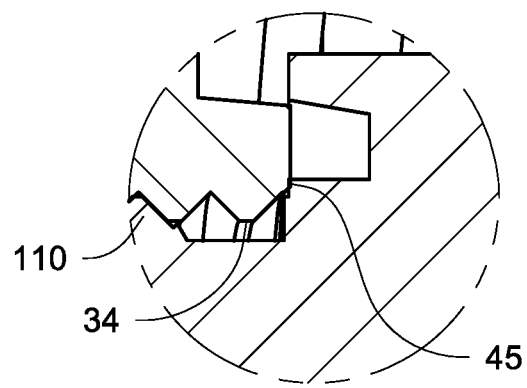
FIG. 15 is a close-up view of the area contained in circle 15 in FIG. 14.

In addition, the valve core 104 has a construction that is similar to the valve body 14 in FIGS. 1-6. However, instead of the exterior threads 50 being on the arms 46, the end 40 of the valve core 104 includes a central protrusion 108 extending therefrom and the protrusion 108 includes continuous exterior circumferential threads 110 that are engageable with the threads 34 as shown in FIG. 14.

When assembled, the valve core 104 can be advanced and retracted relative to the valve body 102 along a longitudinal direction. The valve core 104 has a closed position shown in FIGS. 14 and 15 where the sealing surface 45 is sealed with the valve seat 32 preventing flow through the valve assembly 100, and the threads 34 are engaged with the threads 110. As the valve core 104 is actuated away from the valve seat 32, fluid can begin flowing through the valve assembly 100. So an open position of the valve core 104 can be considered any position of the valve core 104 where the valve core 104 is unseated from the valve seat 32 (any time the valve core 104 is not in the closed position). However, as the valve core 104 is moved in a direction further and further away from the valve seat 32, the flow through the valve assembly 100 becomes less and less restricted. The position of the valve core 104 illustrated in FIG. 13 can be referred to as a fully open position that allows maximum flow through the valve assembly 100. However, maximum flow through the valve assembly 100 may also occur with the valve core 104 at other open positions between the closed position and the fully open position.

Figure 13:
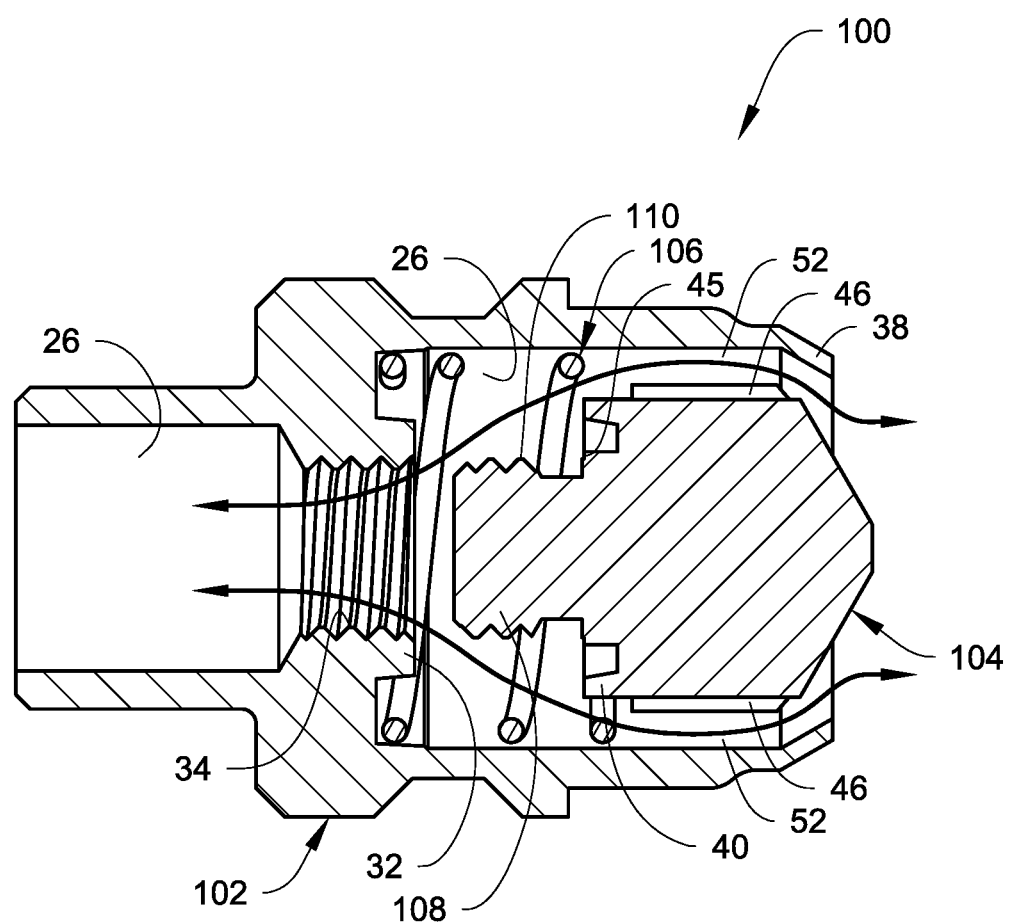
FIG. 13 is a longitudinal cross-sectional view of the service connection valve assembly of FIG. 12 in an assembled condition, with the valve core in a fully open position.

In this embodiment, when the threads 110 on the protrusion 108 of the valve core 104 are no longer engaged with the threads 34, the biasing member 106 biases the valve core 104 to the right in FIG. 13 to the fully open position. The arms 46 help guide and stabilize the valve core 104 as it moves within the valve body 102, and the lip 38 prevents the biasing member 106 from forcing the valve core 104 out through the end of the valve body 102. The valve core 104 is not intended to be removable from the valve body 102. However, in other embodiments, the valve core 104 could be intended to be removable from the valve body 102 in a similar as described above for the valve assembly 10 in FIGS. 1-6.

The biasing member 106 in FIGS. 12-15 can also be used with either one of the embodiments described in FIGS. 1-11 to force the respective valve core to the fully open position once the threads are no longer engaged.

Figure 16:
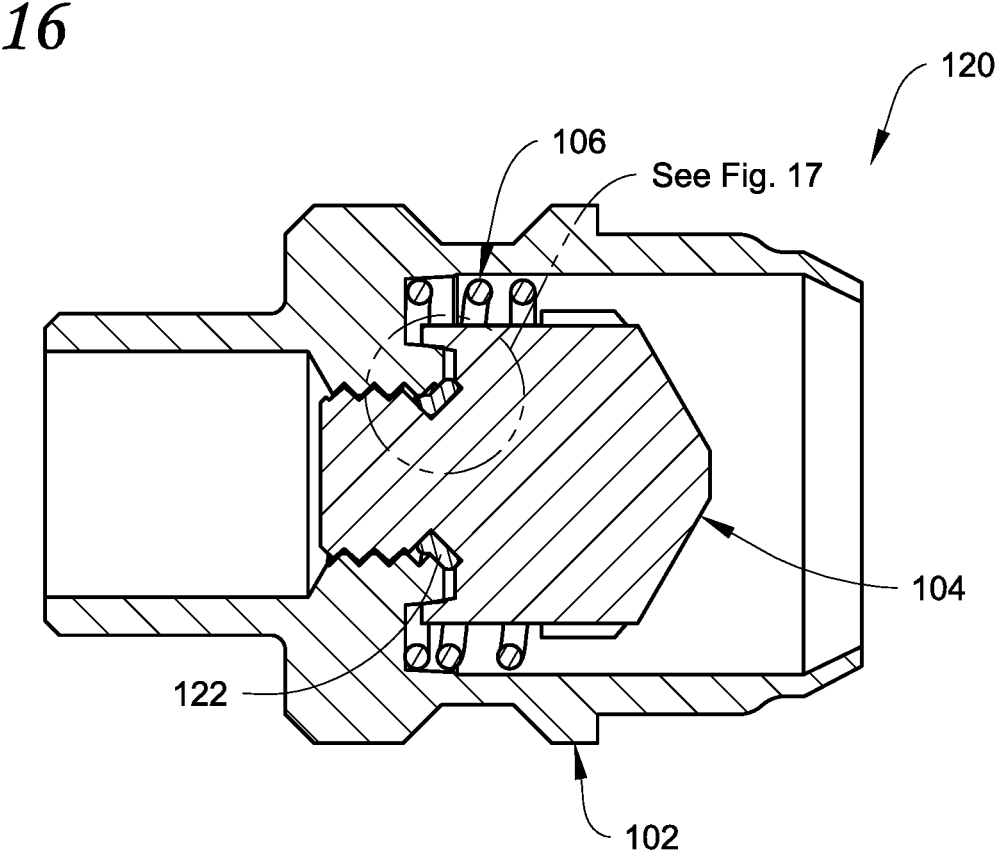
FIG. 16 is a longitudinal cross-sectional view of another embodiment of a service connection valve assembly similar to FIGS. 12-15, that further includes an elastomeric sealing element.
Figure 17:
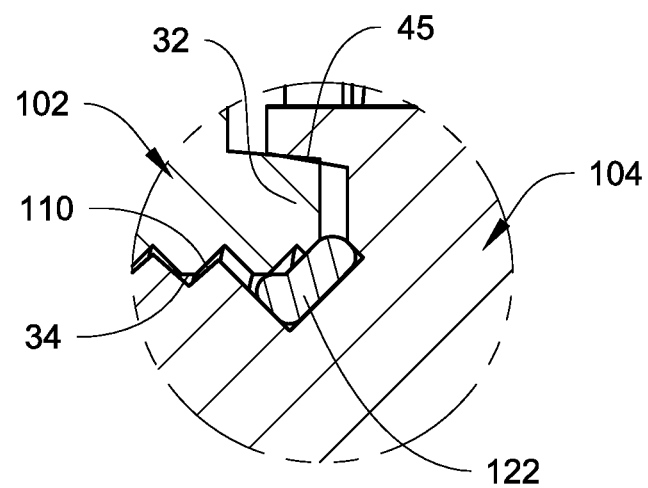
FIG. 17 is a close-up view of the area contained in circle 17 in FIG. 16.

Another embodiment of a service connection valve assembly 120 is illustrated in FIGS. 16 and 17. The valve assembly 120 is similar to the valve assembly 100 and like elements are referenced using the same reference numerals. In this embodiment, the valve assembly 120 includes an elastomeric sealing element 122 that seals between the valve body 102 and the valve core 104 when the valve core 104 is at the closed position shown in FIGS. 16 and 17.

The elastomeric sealing element 122 can be disposed either on the valve body 102 so that the sealing element 122 is stationary relative to the valve body 102, or disposed on the valve core 104 so that the sealing element 122 moves with the valve core 104 relative to the valve body 102. In the illustrated example, the sealing element 122 is disposed on and is movable with the valve core 104. In addition to the sealing element 122, the material-to-material seal can be formed between the valve seat 32 and the sealing surface 45 when the valve core 104 is at the closed position. Therefore, the valve assembly 120 include two separate seals, one (the seal created by the sealing element 122) radially inward from the other (the seal between the valve seat 32 and the sealing surface 45) i.e. the two seals are at radially spaced locations, to help prevent fluid leakage past the valve core 104 when the valve core 104 is closed.

The valve assembly 120 is illustrated as being used with the biasing member 106 that biases the valve core 102 toward the fully open position once the threads 34, 110 are no longer engaged. However, the sealing element 122 need not be used in combination with the biasing member 106, and the sealing element 122 can be used in either one of the embodiments described in FIGS. 1-11.

Therefore, in this embodiment, the valve assembly 120 is illustrated as consisting essentially of the generally cylindrical valve body 102 and the generally cylindrical valve core 104, together with the sealing element 122 and optionally the biasing member 106. However, in other embodiments, the valve assembly 120 can comprise the generally cylindrical valve body 102, the generally cylindrical valve core 104, the sealing element 122 and optionally the biasing member 106.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A service connection valve assembly, consisting of:
   a generally cylindrical valve body and a generally cylindrical valve core, the generally cylindrical valve body is a single piece, and the generally cylindrical valve core is a single piece;
   the generally cylindrical valve body has a first open end with a first opening and a second open end with a second opening, wherein the first opening and the second opening are coaxial to one another, an interior surface defining a passageway extending along a longitudinal axis from the first open end to the second open end, a valve seat within the generally cylindrical valve body through which the passageway extends, threads on a portion of the interior surface between the first open end and the second open end, and a circumferential detent groove on an exterior surface of the generally cylindrical valve body between the first open end and the second open end;
   the generally cylindrical valve core is disposed within the passageway of the generally cylindrical valve body and is movable relative to the generally cylindrical valve body in a direction parallel to the longitudinal axis between an open position where the generally cylindrical valve core is not engaged with the valve seat allowing fluid flow through the service connection valve assembly and a closed position where the generally cylindrical valve core is in sealing engagement with the valve seat preventing fluid flow through the service connection valve assembly, and the generally cylindrical valve core does not project beyond the first open end when the generally cylindrical valve core is at the open position and the generally cylindrical valve core does not project beyond the second open end when the generally cylindrical valve core is at the open position;
   the generally cylindrical valve core includes an exterior surface configured to engage with the threads on the portion of the interior surface when the generally cylindrical valve core is at the closed position; and
   a metal-to-metal seal between the valve seat and the generally cylindrical valve core when the generally cylindrical valve core is at the closed position.

2. The service connection valve assembly of claim 1, wherein the generally cylindrical valve core and the generally cylindrical valve body are configured such that the generally cylindrical valve core is not removable from the generally cylindrical valve body.

3. The service connection valve assembly of claim 1, wherein the generally cylindrical valve core and the generally cylindrical valve body are configured such that the generally cylindrical valve core is removable from the generally cylindrical valve body.

4. The service connection valve assembly of claim 1, wherein the generally cylindrical valve core is located between the valve seat and the second open end when the generally cylindrical valve core is at the open position; and a first portion of the passageway, which extends through the valve seat, has a first maximum diameter, and a second portion of the passageway, which extends from the valve seat to the first open end, has a second maximum diameter that is greater than the first maximum diameter.

5. The service connection valve assembly of claim 1, wherein the generally cylindrical valve core is located between the valve seat and the second open end when the generally cylindrical valve core is at the open position; and an angled shoulder between a first portion of the passageway which extends through the valve seat and a second portion of the passageway which extends from the first open end toward the valve seat, and the angled shoulder faces in a direction toward the first open end.

6. The service connection valve assembly of claim 1, wherein the circumferential detent groove is located on an exterior surface at a position whereby the circumferential detent groove circumferentially surrounds the valve seat.

7. A service connection valve assembly, comprising:
a generally cylindrical valve body and a generally cylindrical valve core;
the generally cylindrical valve body has a first open end and a second open end, an interior surface defining a passageway extending along a longitudinal axis from the first open end to the second open end, a valve seat within the generally cylindrical valve body through which the passageway extends, threads on a portion of the interior surface between the first open end and the second open end;
the generally cylindrical valve core is disposed within the passageway of the generally cylindrical valve body and is movable relative to the generally cylindrical valve body in a direction parallel to the longitudinal axis between an open position where the generally cylindrical valve core is not engaged with the valve seat allowing fluid flow through the service connection valve assembly and a closed position where the generally cylindrical valve core is in sealing engagement with the valve seat preventing fluid flow through the service connection valve assembly;
the generally cylindrical valve core includes an exterior surface configured to engage with the threads on the portion of the interior surface when the generally cylindrical valve core is at the closed position;
a metal-to-metal seal between the valve seat and the generally cylindrical valve core when the generally cylindrical valve core is at the closed position; and
the interior surface includes an unthreaded section between the threads and the second open end; and wherein at the open position, the threads on the exterior surface of the generally cylindrical valve core are aligned with the unthreaded section such that the threads on the exterior surface do not engage with the threads on the portion of the interior surface.

* * * * *